US009223870B2

(12) United States Patent
Salvetti et al.

(10) Patent No.: US 9,223,870 B2
(45) Date of Patent: Dec. 29, 2015

(54) DECORATION OF SEARCH RESULTS BY THIRD-PARTY CONTENT PROVIDERS

(71) Applicant: Microsoft Corporation, Redmond, WA (US)

(72) Inventors: Franco Salvetti, San Francisco, CA (US); Justin John Trobec, Fremont, CA (US); Micol Marchetti-Bowick, Pittsburgh, PA (US); Gianluca Donato, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 13/691,715

(22) Filed: Nov. 30, 2012

(65) Prior Publication Data

US 2014/0156631 A1  Jun. 5, 2014

(51) Int. Cl.
*G06F 17/30* (2006.01)
(52) U.S. Cl.
CPC ................... *G06F 17/30864* (2013.01)
(58) Field of Classification Search
CPC .......... G06F 17/30554; G06F 17/30321; G06F 17/30398; G06F 17/30522; G06F 17/30705; G06F 17/30864; G06F 17/30867; G06F 17/30882
USPC .................................................. 707/709, 710
See application file for complete search history.

(56) References Cited

U.S. PATENT DOCUMENTS

| 6,751,776 B1 | 6/2004 | Gong |
| 7,184,959 B2 | 2/2007 | Gibbon et al. |
| 7,539,659 B2 | 5/2009 | Wong et al. |
| 7,890,331 B2 | 2/2011 | Barbieri et al. |
| 8,051,446 B1 | 11/2011 | Qian et al. |
| 8,108,398 B2 | 1/2012 | Guday et al. |

(Continued)

FOREIGN PATENT DOCUMENTS

| WO | 2009073219 A3 | 9/2009 |
| WO | 2011126510 A1 | 10/2011 |

OTHER PUBLICATIONS

Shih-Fu Chang et al., "Multimedia Search and Retrieval", Published as a chapter in: Advances in Multimedia: Systems, Standards, and Networks, 2000, 28 pages.

(Continued)

*Primary Examiner* — Rehana Perveen
*Assistant Examiner* — Alexander Khong
(74) *Attorney, Agent, or Firm* — David Ream; Douglas Barker; Mickey Minhas (57) ABSTRACT

An ecosystem that enables content providers to decorate search results with interactive content. The searching user can then interact with the content and view the content without leaving the search results page. The content provider sends content and metadata to a content enrichment enabler that transforms the content into an enriched content, and receives back from the enrichment enabler a location identifier which includes information that identifies the provider and the location of the enriched content. The content provider then embeds the identifier in each of the content provider webpages for which such content has been produced. The identifier is indexed by a search engine to identify the interactive content and source thereof for surfacing on a search results page. The search result is decorated with an indicator that the user recognizes as the availability of the enriched content, and uses to access the content via the web page.

20 Claims, 7 Drawing Sheets

(56) References Cited

U.S. PATENT DOCUMENTS

| | | | |
|---|---|---|---|
| 2002/0083471 A1 | 6/2002 | Agnihotri et al. | |
| 2003/0101413 A1* | 5/2003 | Klein et al. | 715/513 |
| 2007/0130068 A1* | 6/2007 | Kitazato et al. | 705/50 |
| 2008/0235594 A1* | 9/2008 | Bhumkar et al. | 715/738 |
| 2010/0228776 A1 | 9/2010 | Melkote et al. | |
| 2011/0115799 A1 | 5/2011 | Imbruce | |
| 2012/0117049 A1* | 5/2012 | Zhou | 707/706 |
| 2012/0166276 A1 | 6/2012 | Chitnis et al. | |
| 2012/0290566 A1* | 11/2012 | Dasher et al. | 707/723 |
| 2013/0031208 A1* | 1/2013 | Linton et al. | 709/217 |
| 2013/0073382 A1* | 3/2013 | Henkin et al. | 705/14.49 |
| 2013/0174017 A1* | 7/2013 | Richardson et al. | 715/234 |
| 2013/0275422 A1* | 10/2013 | Silber et al. | 707/728 |

OTHER PUBLICATIONS

Zhao et al., "Fully Automatic Wrapper Generation for Search Engines", In the Proceedings of the 14th International Conference on World Wide Web, May 10, 2005, 10 pages.

Greg Henderson, "Bing "Action Buttons" Shake Up Search Engines", retrieved at: <<http://seodesk.org/bing-action-buttons-shake-up-search-engines/>>, Sep. 30, 2011, last accessed Sep. 13, 2012, pages.

Thibault, "Bing Unveils Action Buttons on Search Results", retrieved at: <<http://www.them.pro/Bing-Unveils-Action-Buttons-Search-Results>>, Sep. 23, 2011, last accessed Sep. 13, 2012, 5 pages.

"Integrating WebSphere Commerce With Third-Party Ssearch Engines", retrieved at: <<http://publib.boulder.ibm.com/infocenter/wchelp/v7r0m0/index.jsp?topic=%2Fcom.ibm.commerce.developer.doc%2Ftasks%2Ftsdsearchthirdpar.htm>>, Last accessed Sep. 13, 2012, 2 pages.

Melanie Phung, "Yahoo Enhanced Results Allows Embeds Directly Into SERPs", retrieved at: <<http://www.all-about-content.com/2009/03/yahoo-enhanced-results.html, Mar. 18, 2009, last accessed Sep. 13, 2012, 6 pages.

Michael Wong, "MozBar", Mike's Marketing Tools, retrieved at: <<http://www.mikes-marketing-tools.com/directory/mozbar.html>>, last accessed: Sep. 13, 2012, 3 pages.

"Embed Video and Audio Files in Your Web Pages for Better SEO Results", retrieved at: <<http://www.dummies.com/how-to/content/embed-video-and-audio-files-in-your-web-pages-for-.html, last accessed Aug. 29, 2012, 3 pages.

Phil Nottingham, "An SEO's Guide to Video Hosting and Embedding", SEOmoz, retrieved at: <<http://www.seomoz.org/blog/hosting-and-embedding-for-video-seo, Apr. 8, 2012, last accessed Dec. 1, 2012, 63 pages.

Anthony Ha, "Bing Adds Qwiki's Multimedia Presentations to its Search Results", retrieved at: <<http://techcrunch.com/2012/06/12/qwiki-bing/>>, Jun. 12, 2012, last accessed Aug. 29, 2012, 2 pages.

Mark R. Robertson, "Google Previews Video within Search Results", retrieved at: <<http://www.reelseo.com/google-search-video-previews/>>, last accessed Aug. 29, 2012, 5 pages.

Marchetti-Bowick et al., US Patent Application entitled, "Mapping of Topic Summaries to Search Results", U.S. Appl. No. 13/691,713, filed Nov. 30, 2012, and assigned to Microsoft Corporation, 22 pages.

Salvetti et al., US Patent Application entitled, "Embedded Externally Hosted Content in Search Result Page", U.S. Appl. No. 13/691,707, filed Nov. 30, 2012, and assigned to Microsoft Corporation, 32 pages.

* cited by examiner

DECORATION OF SEARCH RESULTS BY THIRD-PARTY CONTENT PROVIDERS

CROSS-REFERENCE TO RELATED APPLICATIONS

This application is related to copending U.S. Patent Application Ser. No. 13/691,713 entitled "MAPPING OF TOPIC SUMMARIES TO SEARCH RESULTS" filed on Nov. 30, 2012 and copending U.S. Patent Application Ser. No. 13/691,707 entitled "EMBEDDED EXTERNALLY HOSTED CONTENT IN SEARCH RESULT PAGE" filed on Nov. 30, 2012.

BACKGROUND

The enormous amount of data available for searching continues to increase unabated, thereby making the prospect of finding the desired information a daunting process. In web search, the search results are oftentimes multimedia content of video, and not only textual. Moreover, the search user interface in the browser conventionally routes the user away from the search results page when selecting a search result—the user is navigated to the source website of the web document associated with the search result. Thus, the user then has to navigate back to the search results page to view any other results. This negatively impacts the user experience by causing changes in the view, and depending on the number of click-throughs, may leave the user disoriented so as to not get back to the search results page.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture is an ecosystem that enables content providers to decorate search results with interactive content (e.g., multimedia). The searching (browser) user can then interact with the content and view the content without leaving the search results page.

The content provider sends content and metadata to a content enrichment enabler that transforms the content into an enriched content. The enrichment enabler then returns a location identifier to the content provider, which identifier includes information that identifies the provider and the location of the enriched content. The content provider then embeds the identifier in each of the content provider webpages for which such content has been produced. The identifier is crawled for indexing and used by a search engine to identify the interactive content and source thereof for surfacing on a search results page. The search result is "decorated" with a content enrichment indicator that the user recognizes as the availability of the enriched content. The decoration process adds the content enrichment indicator in association with the search result on the search results page, such as immediately below the result, to the right of results, etc., so that the viewer understands the indicator is associated with the given result. Thus, the search engine does not handle the actual data but only the indicator, which is used to retrieve the data.

The content provider may host the actual content to render the interactive content (e.g., video) for the user once the user selects (e.g., clicks on) the search result or the enriched content may be hosted or stored at other locations as long as the identifier includes that source information.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture is an ecosystem which enables third-party content owners to facilitate the creation of and decorate search results with enriched content (e.g., multimedia, interactive, etc.). A multi-way relationship is disclosed between content providers, a search engine, a content enrichment enabler, and, optionally, a source from which the enriched content is accessed, to produce and surface enriched content. In this ecosystem, there is no direct communications between the search engine and the enrichment enabler. Content owners can mark specific content with an embedded identifier for which enrichment exists. The identifier provides the location of the enriched content. Thus, identifier from the content provider is used to obtain the enriched content from a location other than the web document.

It is to be understood that while the description herein focuses on the transformation of raw data to enriched data, this transformation is not a requirement, in that the raw data sent by the content provider can simply be wrapped in another format by the enrichment enabler, rather than transformed. The interactive content includes, but is not limited to, images, videos, maps, realtime messages and spoken narration. Thus, third-party content providers can create and distribute enriched content in a format of the content enabler.

Content owners can also decorate specific search results as having available enriched content for retrieval and viewing on a search results page, and cause to be surfaced on the search result page the enriched content that is pulled in from the content source, rather than navigating away from the search results page. Moreover, the search engine need not handle the data of the web document, but only an interactive indicator that when selected causes retrieval of the enriched content from the storage location.

In a public implementation of the disclosed architecture, only the identifier generated by the enrichment enabler is used to surface the enriched content to the user browser. In a private implementation, the identifier and a key are employed in combination, where the key is passed to the user browser so the browser can access the enriched content. In one implementation, only subscribers that have an explicit agreement with the search engine provider and the content enrichment enabler can utilize the ecosystem.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
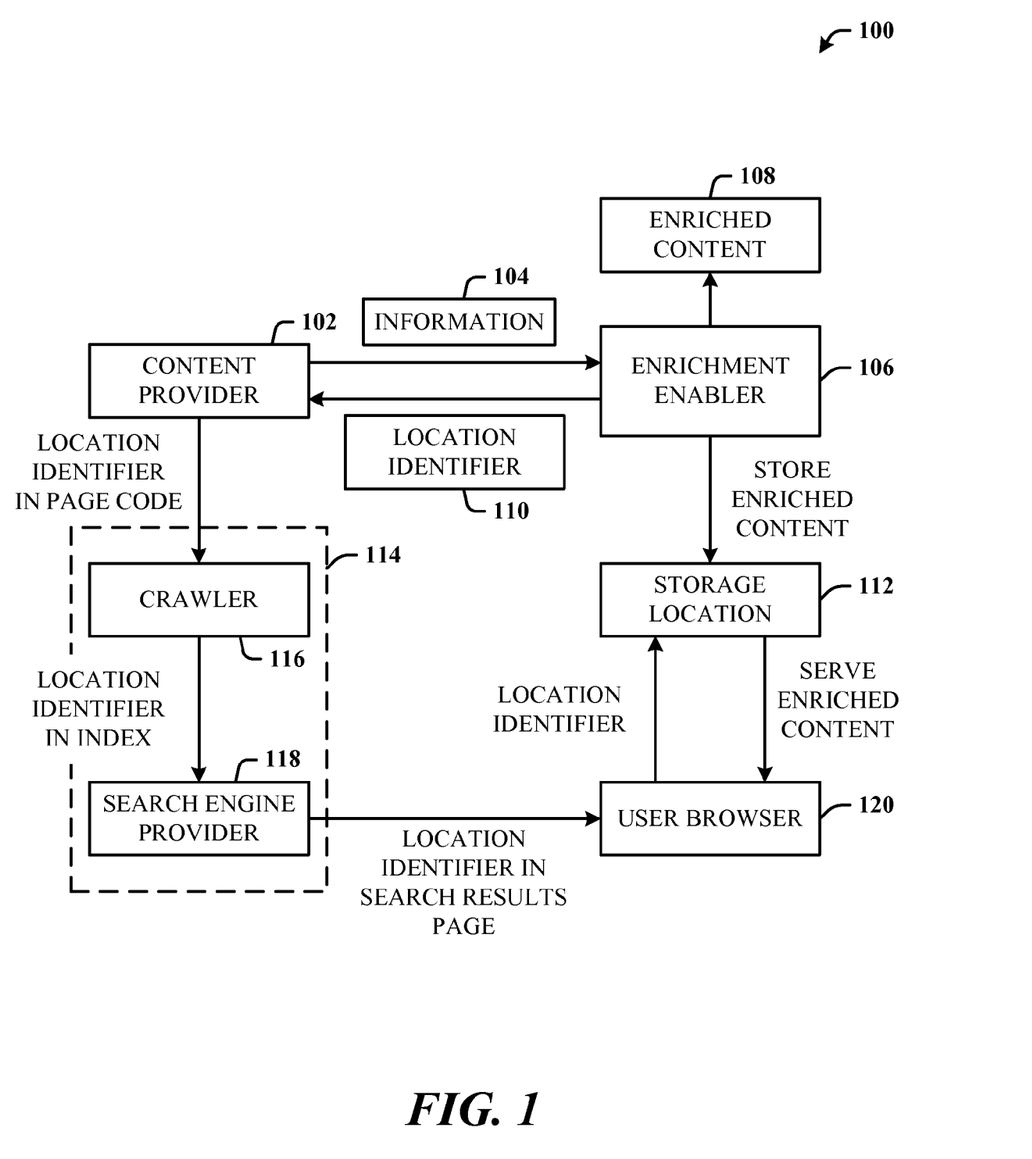
FIG. 1 illustrates a system in accordance with the disclosed architecture.

FIG. 1 illustrates a system 100 in accordance with the disclosed architecture. The system 100 comprises an ecosystem that includes a content provider 102 that sends information 104 (content data and metadata) to an enrichment enabler 106 that transforms content data of the information 104 into enriched content 108. The enrichment enabler 106 then returns a location identifier 110 that identifies both the enriched content 108 and a storage location 112 of the enriched content 108. The storage location 112 can be separate from the enrichment enabler 106 (as depicted) or at the enrichment enabler 106.

The content provider 102 then embeds the location identifier (code) in each of the pages for which the content has been produced. The code is used by a search engine framework 114, which in this implementation includes a crawler 116 and a search engine provider 118 and by the content enrichment enabler 106 to identify the enriched content 108 that will be surfaced on the search results page. The content enrichment enabler 108 may host the enriched content 108 to render the enriched content (e.g., interactive video) for the user once the user selects (e.g., clicks on) on the search result.

During the process of web discovery and indexing of web documents by the search engine framework 114, the embedded identifier 110 in the web documents is detected, and stored as part of the metadata associated with each document in a search index (as part of a search engine process). At serving time, when the search engine provider 118 surfaces that search result on a search results page via a browser 120, the search engine provider 118 decorates the search result with an indicator (not shown) (e.g., active text, objects, etc.) to indicate the availability of the enriched content 108. When the user clicks on the indicator while in the browser 120, the user is presented with a suitable program (e.g., a content player) that uses the identifier 110 to connect to the enrichment enabler 106 to stream the enriched content 108, or to the storage location 112.

In a more specific exemplary implementation, the content provider 102 (e.g., a website owner) chooses to produce a short video using provider content. The content provider 102 sends the raw content data (as part of the information 104) to the enabler 106 through some type of suitable interface. The enrichment enabler 106 transforms the content data into the desired enriched content 108 for the content provider 102. The enrichment enabler 106 returns the identifier 110 that facilitates access to the corresponding enrichment enabler 106 (e.g., of multiple different enablers in the ecosystem). The content provider 102 embeds the identifier 110 in the HTML (hypertext markup language) of one or more set of web documents (e.g., webpages) to indicate that the enriched content 108 is available for that document (or related to the document).

After the crawler 116 crawls the page(s), code is provided that scans the page HTML to extract the specific identifier 110, and stores the identifier 110 with the rest of the metadata extracted from the page and about the page, in the index. When the document is returned in a set of search results, the identifier 110 is passed to the user interface layer (e.g., the browser 120), which then decorates the search result to indicate that a video is available for that page. This decoration can be a text link or a button with, for example, a vendor logo or simply an icon to "play" the video.

When the user clicks on the search result link or button, the browser 120 displays a player by the enabler 106. The player uses the identifier 110 of the specific video (and maybe a provided key) to prove that the identifier 110 came from the search engine provider 118, and then contacts the enabler servers to start sending the content to display (in the browser 120).

In order to restrict the disclosed architecture to only subscribing search engine providers, there can be additional validation stages such as validated communications: a first stage to verify that the content provider 102 is authorized to decorate its results via the search engine provider 118, and a second stage to confirm that only the search engine provider 118 can submit requests to the enrichment enabler 106. In support of the first stage, a whitelist of external domains can be employed with which the search engine provider has an explicit agreement. For the second stage, a one-time key exchange can be included between the enabler 106 and the search engine provider 118. The search engine provider 118 can send the requests to the enrichment enabler 106 with the key to certify that the identifier 110 came from the search engine provider 118. The search engine provider 118 can then digitally sign the identifier returned to the user (browser 120) so the player (program) can create a secure connection to the source of the enriched content 108 (e.g., the storage location 112 or the enabler 106).

Put another way, the system 100 comprises the content provider 102 that sends information 104 for enrichment, an enrichment enabler 106 that processes content data of the information 104 into the enriched content 108 and returns a location identifier 110 to the content provider 102 that identifies a storage location of the enriched content 108. A search engine framework 114 discovers the location identifier 110 in a web document of the content provider 102, indexes the location identifier 110, and serves the enriched content 108 as part of a search result on a search results page based on the location identifier 110.

The enrichment enabler 106 transforms (or wraps) the content data into the enriched content 108 as defined in metadata received as part of the information 104. The search engine framework 114 creates and decorates a search result related to the web document of the content provider 102, in a search results page, with an interactive indicator that indicates an availability of the enriched content 108.

The enriched content 108 is presented in a user browser 120 based on interaction with the indicator, and proximately to the search result, without the browser 120 navigating away from the search results page. The browser 120 launches a program from the enrichment enabler 106 that plays the enriched content 108 in the browser 120. The enriched content 108 is retrieved for play by the program, from a storage location 112 other than the content provider based on the identifier. The enriched content 108 is retrieved from a storage location 112 other than the content provider 102. The search engine framework 114 extracts the identifier from the web document and stores the identifier with metadata of the web document.

Figure 2:
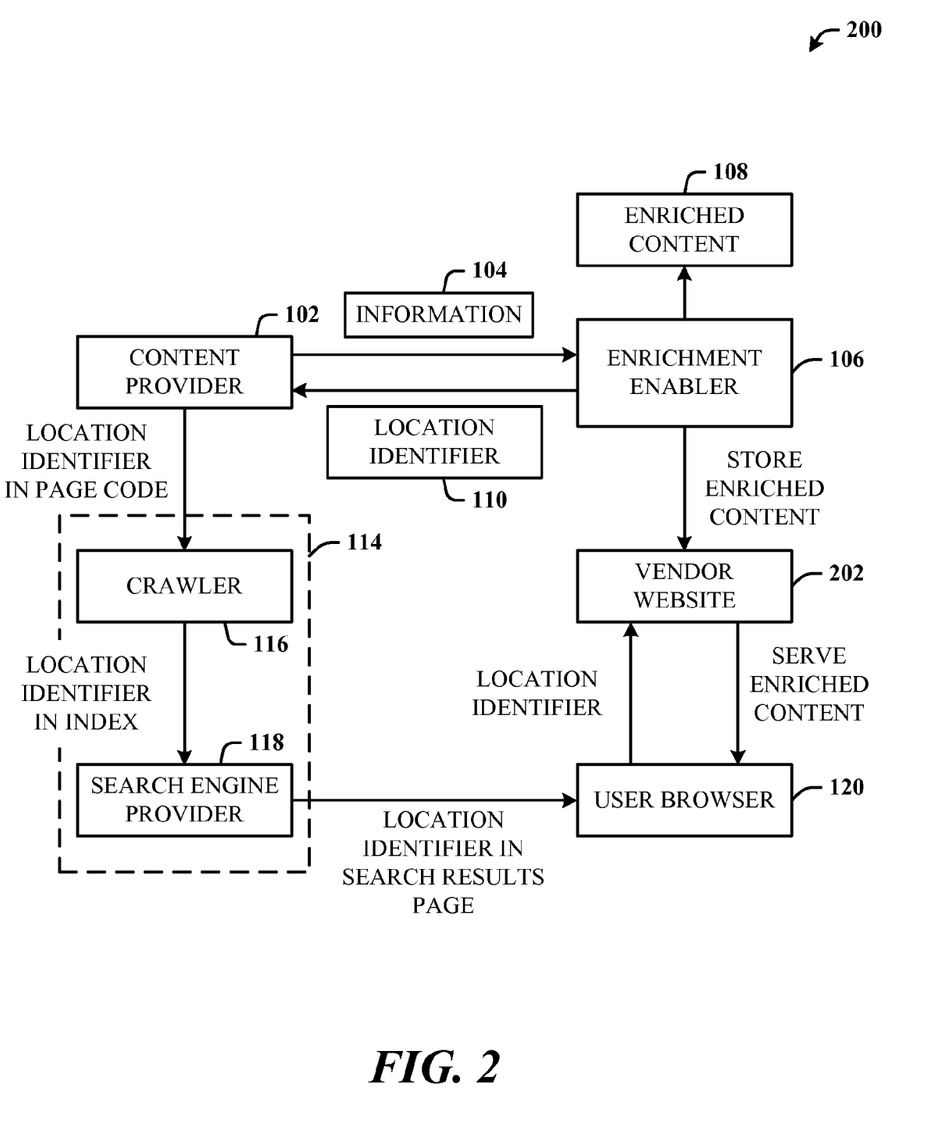
FIG. 2 illustrates an alternative system in accordance with the disclosed architecture implemented in a private setting.

FIG. 2 illustrates an alternative system 200 in accordance with the disclosed architecture implemented in a private setting. Here, the storage location 112 of FIG. 1 is now a vendor website 202. Thus, when the user navigates to the vendor website 202 via the user browser 120, the user can be presented with a vendor item that is decorated with the interactive indicator, which indicates to the user that other content (the enriched content 108) is available for viewing for the given vendor item. When the user selects the interactive indicator, the vendor website 202 processes the associated location identifier and accesses the enriched content 108 from the storage location indicated in the location identifier. This storage location can be at the enrichment enabler 106 or the vendor website 202, for example.

Given that the enriched content 108 was transformed (or wrapped) by the enabler 106, once selected, the browser plays a program provided by and from the enabler 106 to view the enriched content in the vendor page without navigating away from the vendor page. Note that in this example, the search framework 114 was not utilized, since the location identifier was embedded in association with the vendor item or the interactive indicator on the vendor page. The location identifier can be used in combination with a key to ensure that only the content related to the location identifier is retrieved and presented.

Figure 3:
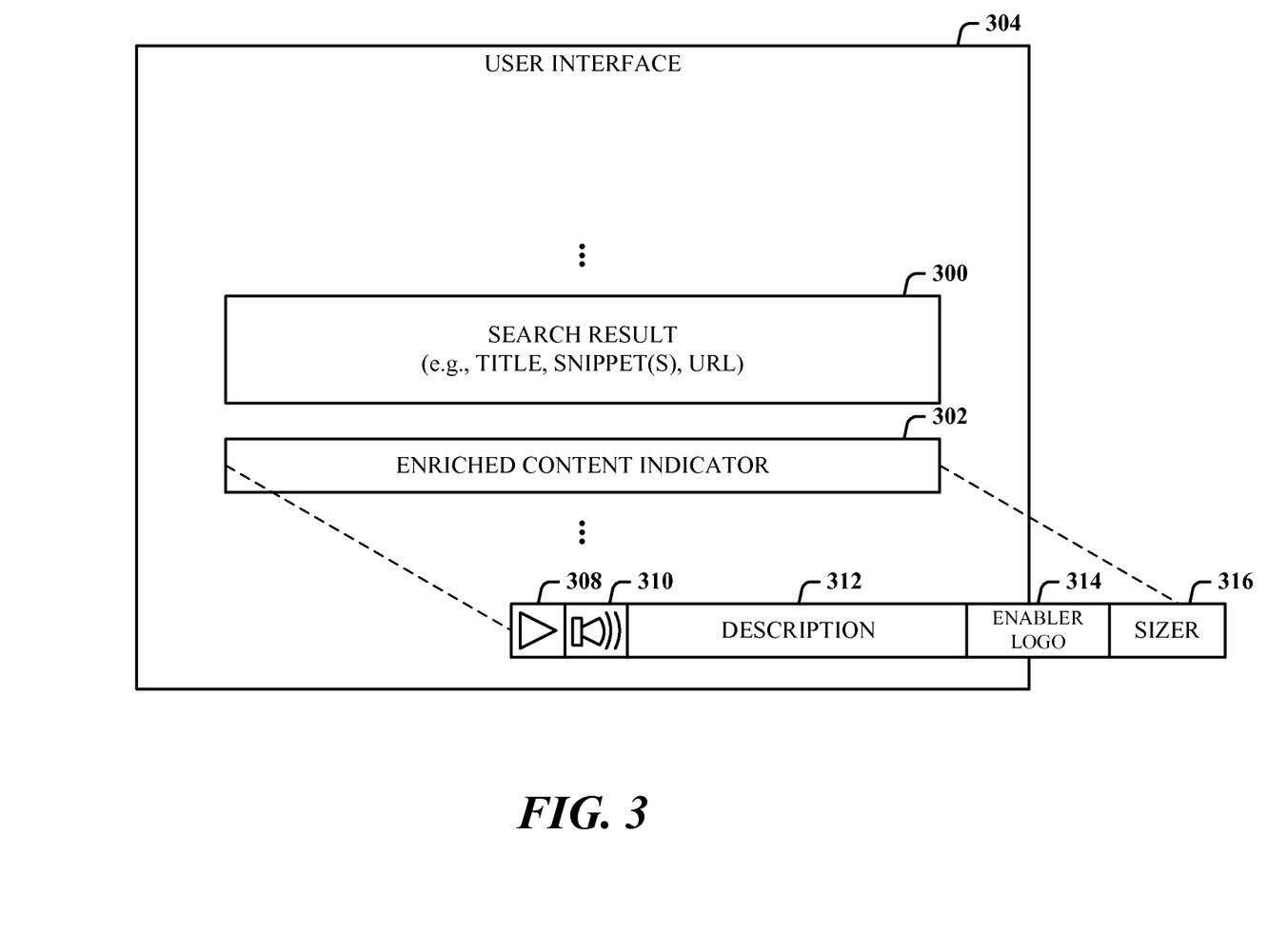
FIG. 3 illustrates a search result decorated with an enriched content indicator as presented in a user interface of a browser as before selection.

FIG. 3 illustrates a search result 300 decorated with an enriched content indicator 302 as presented in a user interface 304 of a browser as before selection. The search result 300 includes commonly employed elements such as the linkable title, one or more snippets of text that provide a piece or pieces of text content from the associated webpage, and a link (URL—uniform resource locator) to the webpage.

In this particular example, the enriched content includes video content. Accordingly, the indicator 302 can include a set of controls 306 that facilitate interaction with the video content in the browser (and not from navigation to another web document related to the search result 300). The set of controls 306 can include a play control 308 for controlling play, pause, rewind, etc., an audio control 310 for controlling volume of an audio system, an annotated (description) control 312 that when selected retrieves the enriched content from the storage location, an enabler logo 314 (e.g., trademark) which relates to the identity of the enrichment enabler to indicate to the user the entity that created the enriched content, and a video sizer 316 that expands the video being played to full screen (full size) or a reduces the video to a default view (default size) screen. The indicator 302 can be defined by metadata of content enrichment enabler and which metadata is indexed by the search framework with the location identifier.

Figure 4:
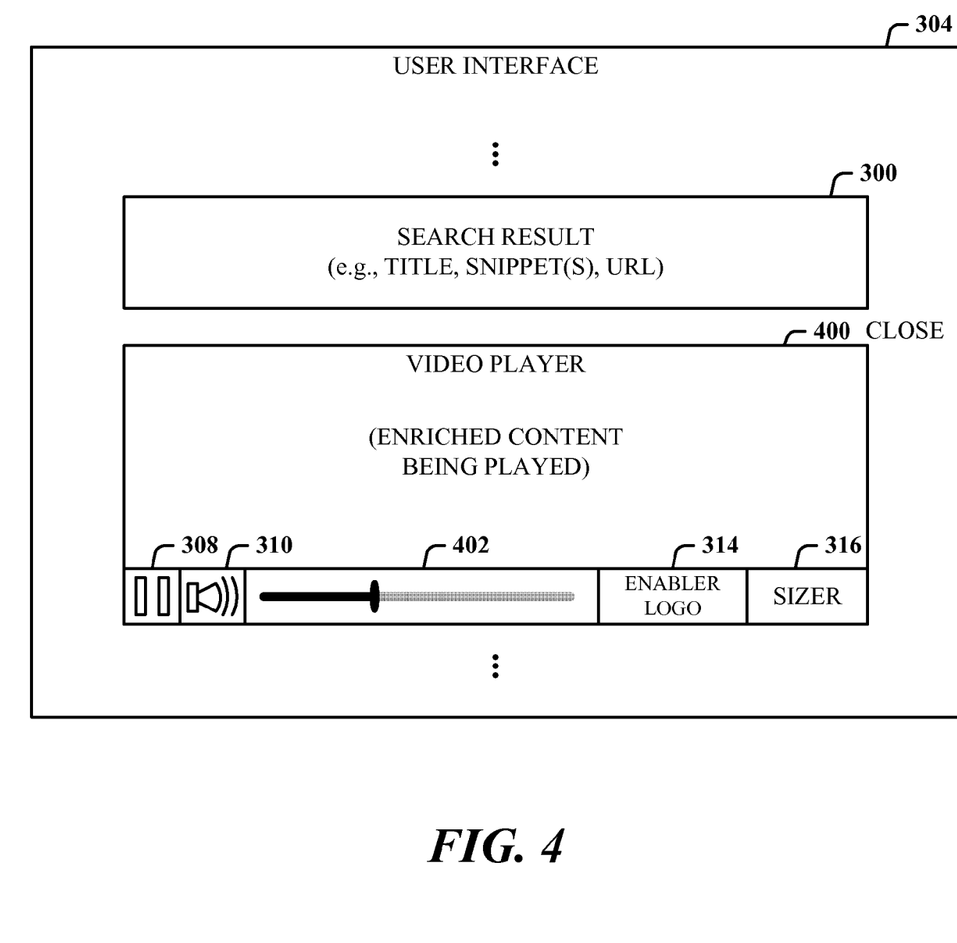
FIG. 4 illustrates the search result as viewed with presentation of the enriched content in the user interface of a browser after selection of the indicator.

FIG. 4 illustrates the search result 300 as viewed with presentation of the enriched content in the user interface 304 of a browser after selection of the indicator. Once selected, the indicator 302 of FIG. 3 is replaced in the view with a player 400 that plays the enriched content. Accordingly, a player progress bar 402 is shown to track play progress of the enriched content. Additionally, the play control 308 switches to a pause indication, should the user choose to pause play, the audio control 310 remains for controlling volume of an audio system, the annotated (description) control 312 is the replaced with the player progress bar 402, the enabler logo 314 remains, and the video sizer 316 remains to enable the user to switch between full screen and a default screen size.

The player 400 can be downloaded from the enrichment enabler or other location for play of a proprietary format of the enriched content, if the enriched content is transformed into a proprietary format, or be a commonly installed local player that automatically launches in response to selection of the indicator 302 of FIG. 3 if the enriched content is of a commonly-used format.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
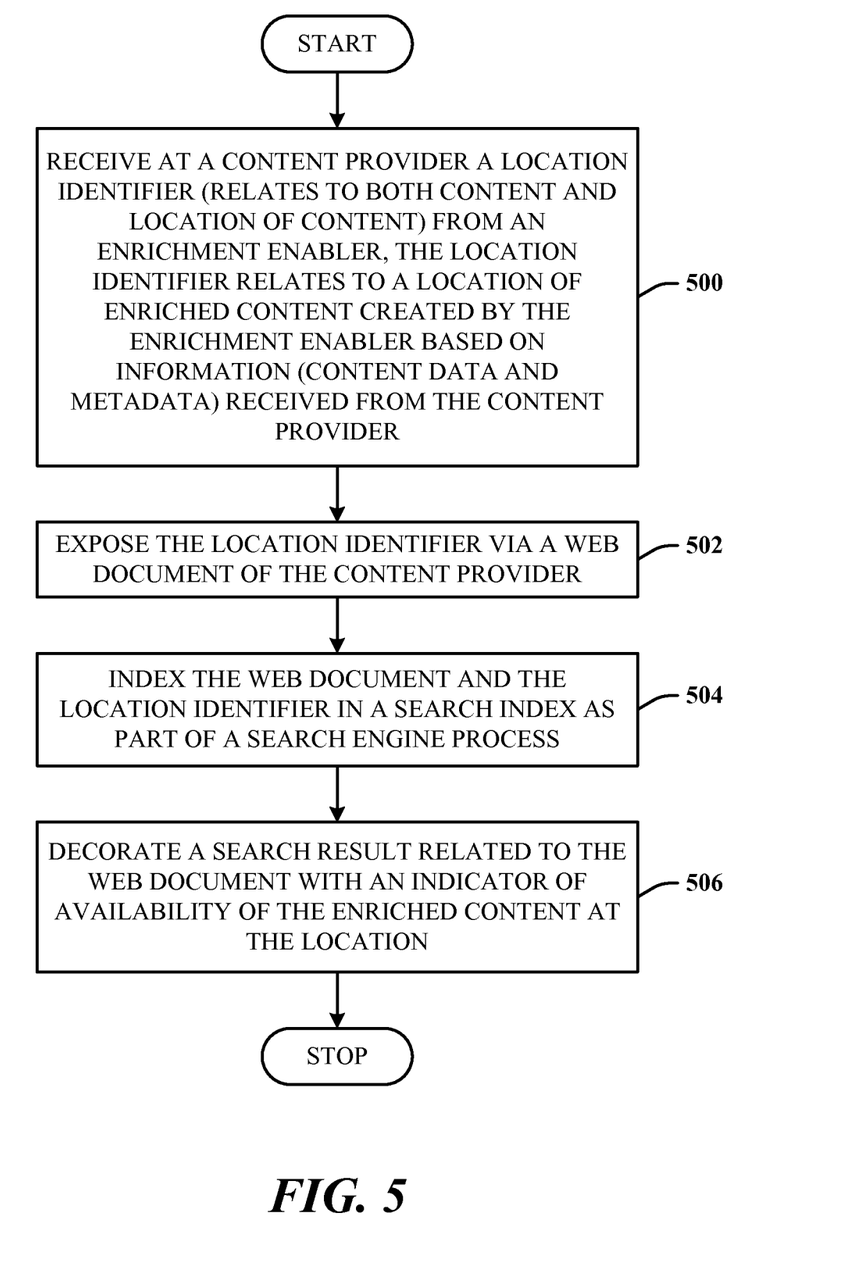
FIG. 5 illustrates a method in accordance with the disclosed architecture.

FIG. 5 illustrates a method in accordance with the disclosed architecture. At 500, at a content provider, a location identifier is received from an enrichment enabler. The location identifier relates to both content and location of content. The location identifier relates to the location of enriched content created by the enrichment enabler based on information (content data and metadata) received from the content provider. At 502, the location identifier is exposed via a web document of the content provider. In other words, the location identifier can be in the document metadata, external to, or generated by some code (e.g., javascript™). At 504, the web document and the location identifier are indexed in a search index as part of a search engine process. At 506, a search result related to the web document is decorated (presented proximately with or to) with an indicator (e.g., interactive object such as a button) of the availability of the enriched content at the location.

The method can further comprise converting content of the information into the enriched content using metadata supplied as part of the information. For example, the content can be converted (transformed) into a video by the enrichment enabler such that the video is playable only using a program of the enabler or of a format playable by other commonly used players. The method can further comprise serving the enriched content in a browser based on selection of the indicator. The indicator can simply be an interactive button or other type of object in the browser user interface, the button annotated with data useful to the user in understanding the purpose of the button.

The method can further comprise serving the enriched content based on a predefined agreement between a search engine provider and a host (storage source or location) of the enriched content. The agreement can be a business agreement that contractually entitles only agreement parties to engage in the disclosed architecture. The method can further comprise indexing the location identifier in association with content provider metadata of the web document. The content provider metadata can define attributes of the content provider such as name, address, etc.

The method can further comprise launching a program to run the enriched content from the location in response to selection of the indicator, the location other than the content provider. The program can be proprietary to the enrichment enabler so that enriched content can only be played using the program. Alternatively, the enriched content can be made into a format that is recognized and playable on commonly used programs.

The method can further comprise transforming the content data of the information into the enriched content, which is interactive content. This transformation can be accomplished by the enabler using one or more programs and/or techniques, some of which may be proprietary to the enabler. For example, the content data provided by the content provider can be sent to the enabler to benefit from desired techniques that provide an improved user experience when viewing the enriched data.

The method can further comprise enabling access to the enriched content based on a key. The access provided throughout this ecosystem of content provider, search engine, enrichment enabler, and optionally, a storage location (or host) that is other than any one or more of the prior three entities can be controlled using an encryption key that enables restricted access and/or utilization of the disclosed architecture to only authorized subscribers such as in a private implementation versus an open public implementation.

Figure 6:
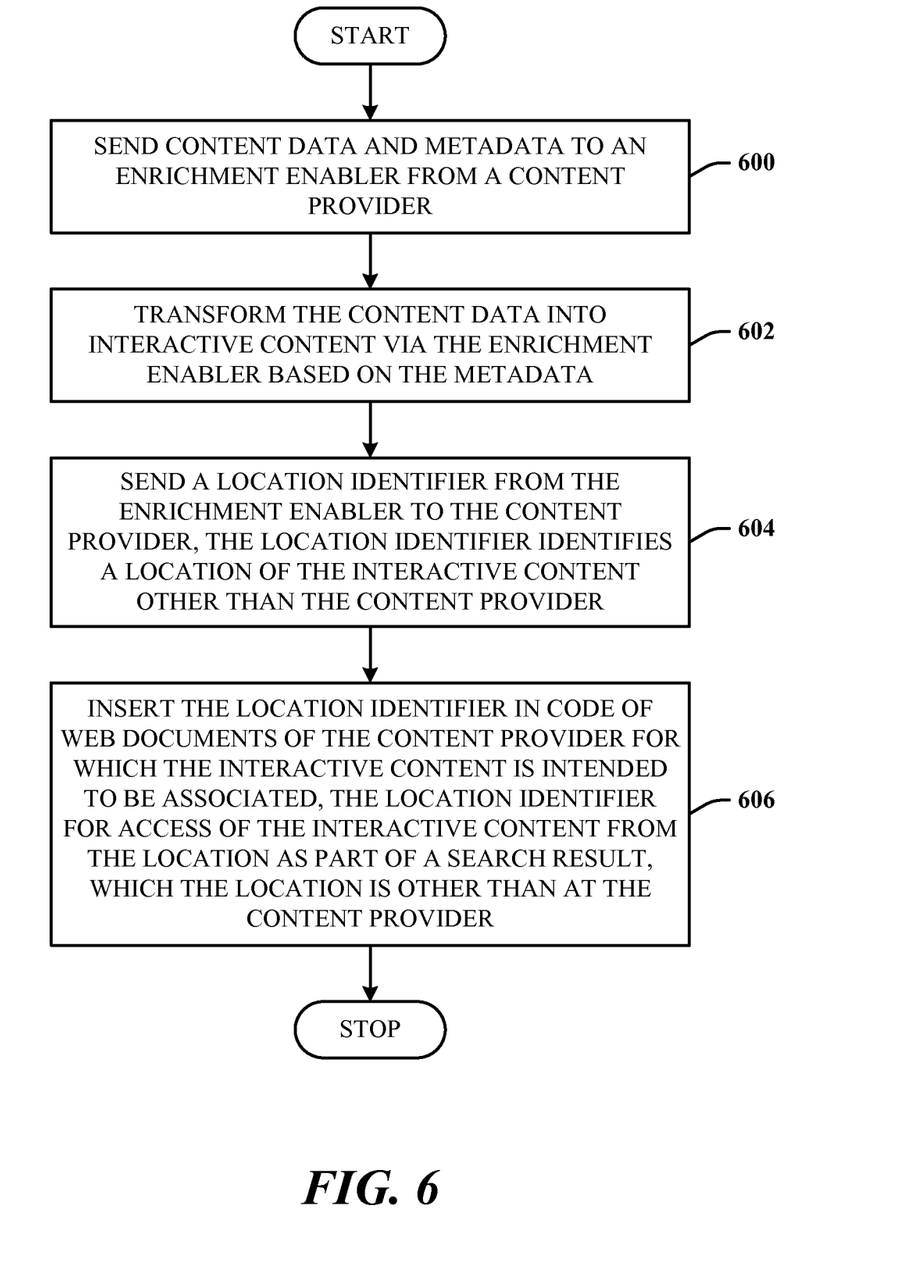
FIG. 6 illustrates an alternative method in accordance with the disclosed architecture.

FIG. 6 illustrates an alternative method in accordance with the disclosed architecture. At 600, content data and metadata are sent to an enrichment enabler from a content provider. The metadata defines how the user wants the content data to be transformed by the enrichment enabler for final presentation to the viewer. At 602, the content data is transformed into interactive content via the enrichment enabler based on the metadata. At 604, a location identifier is sent from the enrichment enabler to the content provider. The location identifier identifies a location of the interactive content other than the content provider. At 606, the location identifier is inserted into code of web documents of the content provider for which (the web documents) the interactive content is intended to be associated. The location identifier provides access of the interactive content from the location as part of a search result of a search results page. The location is a location other than the location of the content provider.

The method can further comprise accessing and presenting the interactive content via a web document without leaving the web document. In other words, in conventional search systems, when the user is presented with search results, and select a specific result to access additional information, the browser will navigate away from the current page to the document associated with the search result. However, here, the browser does not navigate for the current results page, but appears to bring the enriched data from the enriched data source to the search results page without moving away from the current view.

The method can further comprise decorating a search result related to a web document with an indicator of availability of the interactive content. The method can further comprise restricting access to the location and the interactive content using an encrypted key and based on a business agreement. The method can further comprise storing the location identifier in association with the web documents during indexing.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
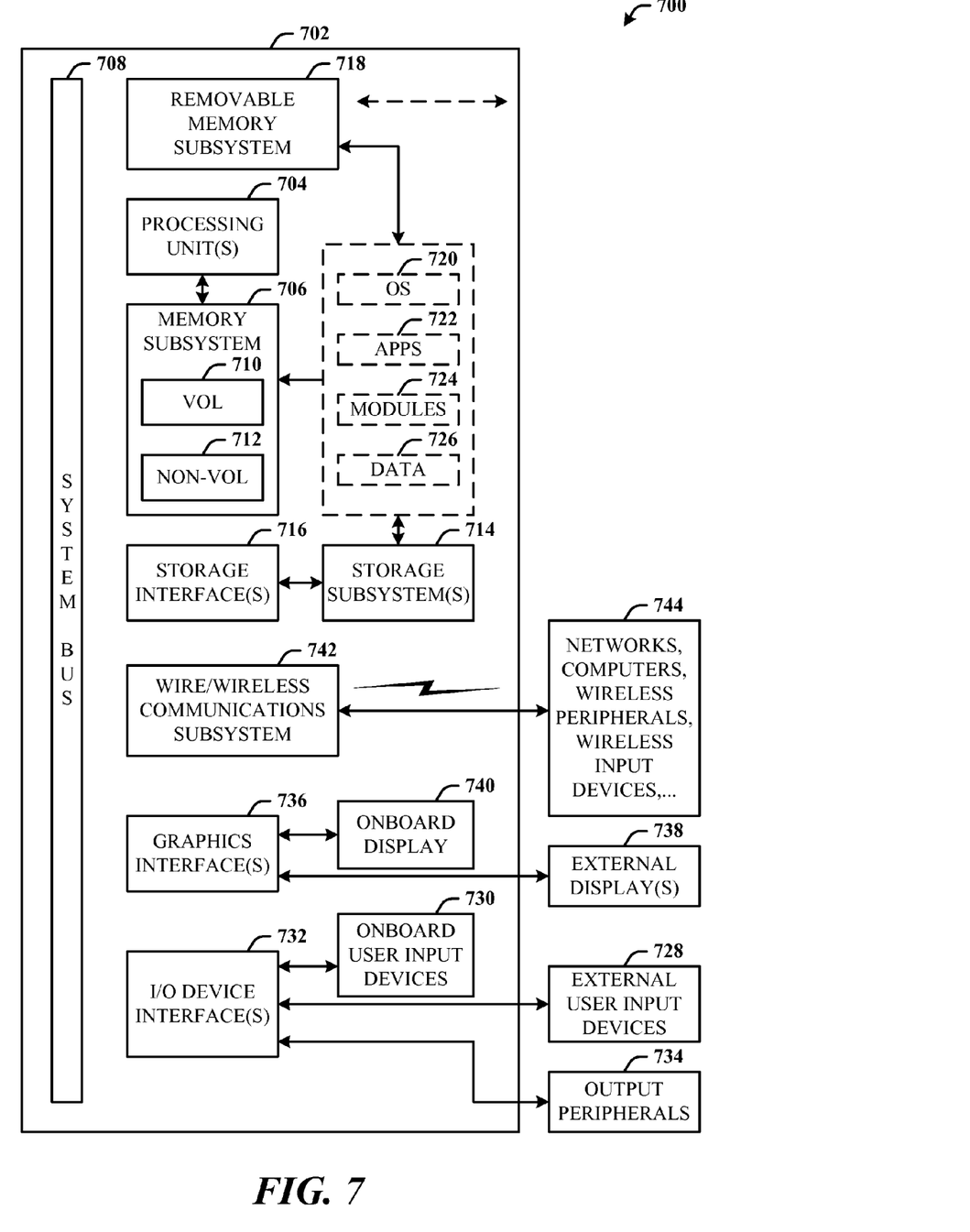
FIG. 7 illustrates a block diagram of a computing system that facilitates the decoration and execution content in association with a search result using content created by a content provider but from a location other than the content provider in accordance with the disclosed architecture.

Referring now to FIG. 7, there is illustrated a block diagram of a computing system 700 that facilitates the decoration and execution content in association with a search result using content created by a content provider but from a location other than the content provider in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704 (also referred to as microprocessor(s) and processor(s)), a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 702 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include entities and components of the system 100 of FIG. 1, entities and components of the system 200 of FIG. 2, entities and components of the search result 300, indicator 302, and user interface 304 of FIG. 3, entities and components of the search result 300, player 400, and user interface 304 flow of FIG. 4, and the methods represented by the flowcharts of FIGS. 5 and 6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that does not employ propagated signals, can be accessed by the computer 702, and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse, as well as by voice commands facilitated by speech recognition. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example.

These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a content provider configured to send information from a third-party content owner for enrichment;
an enrichment enabler configured to receive the information from the content provider and to process content data of the information into enriched content and return a location identifier to the content provider that identifies a storage location of the enriched content, such that the location identifier is embedded in a web document of the third-party content owner to indicate that the enriched content is available for that web document;
a search engine framework configured to discover the location identifier in the web document of the content provider, index the location identifier, and serve the enriched content as part of a search result on a search results page based on the location identifier, wherein the search engine framework is configured to decorate a search result related to the web document in a search results page with an indicator that indicates availability of the enriched content, the enriched content is presented in a browser proximately to the search result based on interaction with the indicator; and
a microprocessor configured to execute computer-executable instructions associated with at least one of the content provider or the enrichment enabler.

2. The system of claim 1, wherein the enrichment enabler is configured to transform the content data into the enriched content as defined in metadata received as part of the information.

3. The system of claim 1, wherein the search engine framework is configured to create and decorate the search result related to the web document of the content provider, in the search results page, with the indicator that indicates an availability of the enriched content.

4. The system of claim 3, wherein the enriched content is presented in a user browser based on interaction with the indicator, and proximately to the search result, without the browser navigating away from the search results page.

5. The system of claim 3, wherein the browser is configured to launch a program from the enrichment enabler that plays the enriched content in the browser, the enriched content retrieved for play in the program from a storage location other than the content provider based on the identifier.

6. The system of claim 1, wherein the enriched content is retrieved from a storage location other than the content provider.

7. The system of claim 1, wherein the search engine framework is configured to extract the location identifier from the web document and store the location identifier with metadata of the web document.

8. A method, performed by a computer system executing machine-readable instructions, the method comprising acts of:
sending information from a third-party content provider to an enrichment enabler via a content provider;
processing the information received from the content provider into enriched content at the enrichment enabler;
receiving at the content provider a location identifier from the enrichment enabler, the location identifier relates to a location of the enriched content created by the enrichment enabler;
embedding the location identifier in a web document to indicate that the enriched content is available for the web document;
exposing the location identifier via the web document of the content provider;
indexing the web document and the location identifier in a search index as part of a search engine process;
decorating a search result related to the web document with an indicator of availability of the enriched content at the location;
presenting the enriched content in a browser and proximately to the search result based on interaction with the indicator; and
configuring at least one processor to perform at least one of the acts of sending, processing, receiving, embedding, exposing, indexing, decorating, or presenting.

9. The method of claim 8, further comprising converting content of the information into the enriched content using metadata supplied as part of the information.

10. The method of claim 8, further comprising serving the enriched content in a browser based on selection of the indicator.

11. The method of claim 8, further comprising serving the enriched content based on a predefined agreement between a search engine provider and a host of the enriched content.

12. The method of claim 8, further comprising indexing the location identifier in association with content provider metadata of the web document.

13. The method of claim 8, further comprising launching a program to run the enriched content from the location in response to selection of the indicator, the location other than the content provider.

14. The method of claim 8, further comprising transforming content data of the information into the enriched content.

15. The method of claim 8, further comprising enabling access to the enriched content based on a key.

16. A method performed by a computer system executing machine-readable instructions, the method comprising:
providing content data and metadata from a third-party content provider to an enrichment enabler;
transforming the content data into interactive content via the enrichment enabler based on the metadata;
returning a location identifier from the enrichment enabler to the third-party content provider, the location identifier identifies a location of the interactive content other than the third-party content provider;
inserting the location identifier in code of web documents of the third-party content provider for which the interactive content is to be associated;
crawling the web documents by a search engine to extract the location identifier for access of the interactive content from the location as part of a search result, which the location is other than at the third-party content provider;
decorating a search result related to a web document with an indicator of availability of the interactive content;
presenting the enriched content in a browser and proximately to the search result based on interaction with the indicator; and
configuring at least one processor to perform at least one of the acts of providing, transforming, returning, inserting, crawling, decorating, or presenting.

17. The method of claim 16, further comprising accessing and presenting the interactive content via a web document without leaving the web document.

18. The method of claim 16, further comprising restricting access to the location and the interactive content using an encrypted key and based on a business agreement.

19. The method of claim 16, further comprising storing the location identifier in association with the web documents during indexing.

20. The method of claim 16, further comprising launching a program to run the interactive content from the location in response to selection of the indicator, the location other than the third-party content provider.

* * * * *